United States Patent [19]
Johnson

[11] 4,448,737
[45] May 15, 1984

[54] METHOD AND APPARATUS FOR PRODUCING FOAMED PRODUCTS FROM A MIX OF RECLAIMED PLASTIC FOAM MATERIAL AND FOAMABLE VIRGIN PLASTIC RESIN

[75] Inventor: David E. Johnson, Canandaigua, N.Y.

[73] Assignee: Mobil Oil Corporation, New York, N.Y.

[21] Appl. No.: 454,781

[22] Filed: Dec. 30, 1982

[51] Int. Cl.³ .............. B29D 27/00; B29C 17/03; B29H 19/00
[52] U.S. Cl. .............................. 264/53; 264/37; 264/140; 264/151; 264/321; 264/DIG. 15; 264/DIG. 69; 425/202; 425/205; 425/289; 425/817 C
[58] Field of Search ............... 264/37, DIG. 69, 321, 264/51, 53, DIG. 15, 140, 151; 425/93, 817 C, 289, 202, 205

[56] References Cited

U.S. PATENT DOCUMENTS

| | | | |
|---|---|---|---|
| 3,065,502 | 11/1962 | Lorenian | 425/93 X |
| 4,136,142 | 1/1979 | Hargreaves et al. | 264/53 |
| 4,246,211 | 1/1981 | Kuhnel | 521/81 |

OTHER PUBLICATIONS

F. H. Collins, "Controlled Density Polystyrene Foam Extrusion", SPE Journal, Jul. 1960, pp. 705–709.

*Primary Examiner*—Philip E. Anderson
*Attorney, Agent, or Firm*—Alexander J. McKillop; Michael G. Gilman; Charles J. Speciale

[57] ABSTRACT

A system and a method for the production of thermoformable plastic foam material from a mix of plastic foam selvage and a foamable virgin plastic resin. Accordingly, the present invention provides for a selvage formed during the production of thermoformed foam material articles from a plastic foam sheet stock is recycled and admixed with the virgin foamable plastic resin, in that the material components are admixed in a feed hopper and then conducted from the feed hopper into a twin-screw compressor which will impart a positive forward feed to the compressible plastic materials conveyed therethrough.

12 Claims, 5 Drawing Figures

METHOD AND APPARATUS FOR PRODUCING FOAMED PRODUCTS FROM A MIX OF RECLAIMED PLASTIC FOAM MATERIAL AND FOAMABLE VIRGIN PLASTIC RESIN

BACKGROUND OF THE INVENTION

1. Field of the Invention

The present invention relates to a method and apparatus for the production of thermoformable plastic material and, more particularly, relates to the production of the thermoformable plastic material from a mix of plastic selvage and a virgin plastic resin.

In the producton of thermoformed articles from plastic foam material which is generally constituted of plastic foam sheet stock, such as from polystyrene or the like, a significant proportion of the plastic sheet material remains as selvage subsequent to the effectuation of the thermoforming sequence. This selvage can be readily reclaimed and then reutilized as a component of the initial feed material or stock for preparing more plastic sheet stock. As a result, the reclaimed plastic selvage material and virgin plastic resin which are admixed in order to produce the feed stock for the plastic material sheet stock presents an economically advantageous situation in view of the substantial recovery of scrap material formed during the production of the thermoformed articles.

2. Discussion of the Prior Art

Heretofore, prior to admixing the virgin plastic resin and the reclaimed selvage, it has been the common procedure to independently process and remelt the reclaimed selvage and then to subsequently admix the remelted scrap with the virgin plastic resin. Consequently, this required a cumbersome reclaiming system and apparatus necessitating the utilization of separate selvage melt processing arrangements frequently rendering the reclaiming of selvage time-consuming and uneconomical.

SUMMARY OF THE INVENTION

Accordingly, the present invention provides for a system and a method wherein selvage formed during the production of thermoformed articles from a plastic sheet slack is recycled and admixed with a virgin plastic resin, in that the material components are admixed in a feed hopper and then conducted from the feed hopper into a twin-screw compressor which will impart a positive forward feed to the compressible plastic materials conveyed therethrough.

Pursuant to the invention, the feed hopper is provided with a novel unique rotatable screw member which is rotated in a reverse direction whereby the rotatable screw causes the reclaimed selvage and virgin resin materials to be admixed and concurrently pulled back into the feed hopper. Through construction of the reversely rotating screw in the form of a helically-coiled stretched spring, this reverse rotation will inhibit compression of the admixed solids in the feed hopper at the throat or infeed to the twin-screw compressor, but will allow the mixed materials to freely flow through the hollow center of the reversely rotating screw or spring at a constant tumbled density, thereby ensuring a uniform feed rate of the admixed materials from the feed hopper into the twin-screw compressor. Furthermore, the employment of the novel twin-screw compressor, wherein a pair of counter-rotating interdigitating screws effect a positive forward feed of the intermixed ground selvage fluff and virgin foamable resin materials will cause the twin-screw compressor to uniformly compact and then feed the compressed combined material into a suitable extruder which will produce a melt of the material for conveyance to a cooling extruder providing for the ultimate extrusion of a tubular sheet of thermoformable plastic material, such as a foamed polystyrene.

Accordingly, it is a primary object of the present invention to provide a system and a method of producing a thermoformable plastic material from a mixture of recycled plastic selvage and from a virgin plastic resin.

It is a more specific object of the present invention to provide a system for the production of a thermoformable plastic foam sheet material wherein selvage reclaimed from previously formed thermoformable product is comminuted into fluff, admixed with a virgin foamable plastic resin, and conveyed through the intermediary of a unique feed hopper having a reversely rotating screw element therein to prevent compression of the admixed materials at the infeed or throat of a positive forward-feed twin-screw compressor and to allow them to freely and uniformly flow into the compressor.

Yet another object of the present invention is to provide a system and a method for forming foamed plastic articles from feed stock of a mixture of recycled selvage and virgin foamable polymer resins, wherein the component of the recycle selvage material constitutes up to about 50% by weight of the total feed stock material, and wherein the admixed material is freely and uniformly conducted from a feed hopper into a twin-screw positive forward feed compressor for conveying the material at a uniform density into a first extruder forming a melt of the material, and from the latter into a further extruder for the extrusion of tubular foamed sheet material from which the thermoformed articles are produced.

BRIEF DESCRIPTION OF THE DRAWINGS

Reference may now be had to the following detailed description of the a preferred embodiment of the invention, taken in conjunction with accompanying drawings; in which.

DETAILED DESCRIPTION

Figure 1:
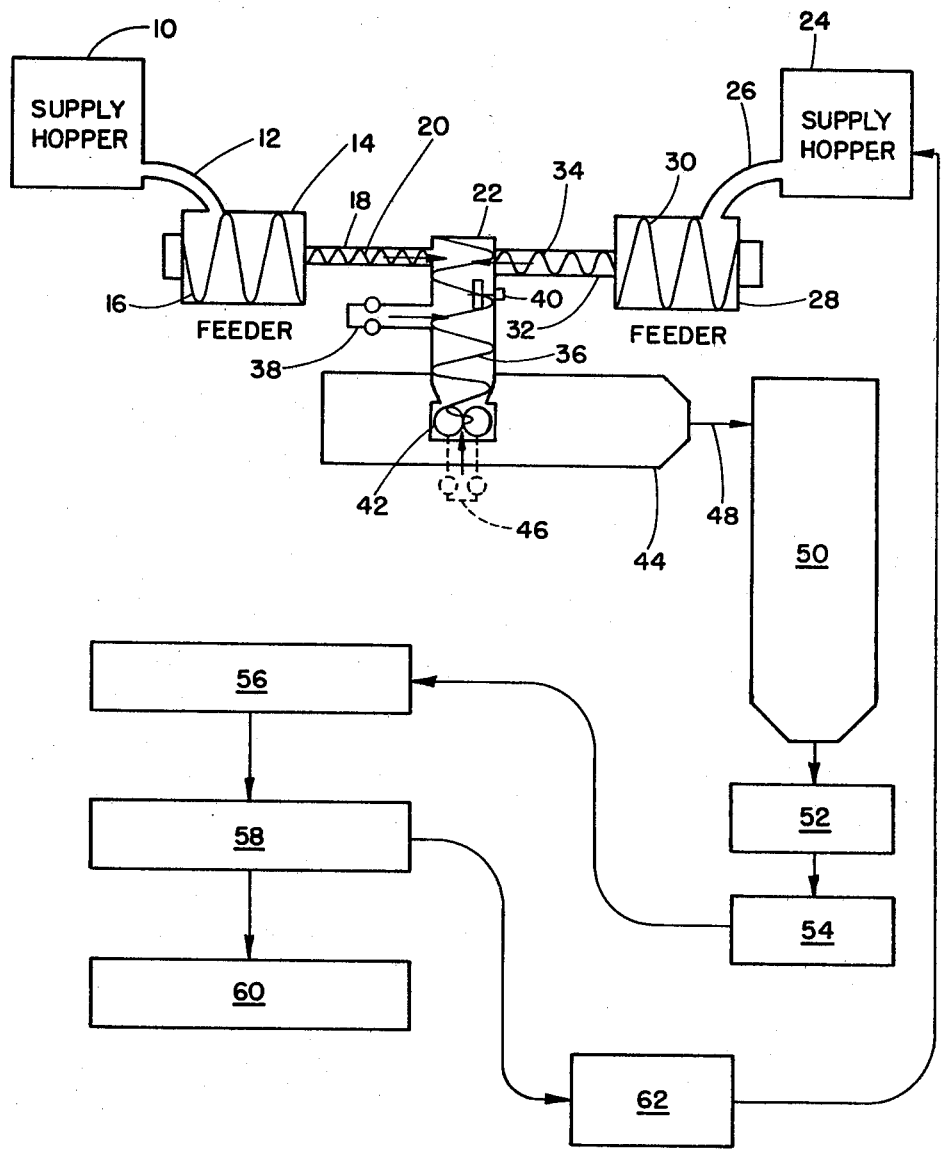
FIG. 1 illustrates a schematic flow diagram of a direct fluff feeding system for the mixing and feed of virgin foamable plastic resins with recycled selvage material.

Referring now in particular to FIG. 1 of the drawings, there is illustrated a generally schematic flow diagram for the extrusion of a thermoformable foamed polymer material, for example, such as polystyrene, and for the recycling of selvage for reuse in the extrusion feed stock.

In essence, the system includes a supply hopper 10 for the provision of a supply of foamable virgin polymer pellets, such as polystyrene through a gravity flow conduit 12 into a feeder unit 14. The feeder unit 14 for the virgin polymer pellets may incorporate a rotatable feed screw element 16 for conducting the polymer pellets into a conduit 18, the latter of which is provided with a similar screw type element 20 for uniformly and continuously conveying the polymer material into a feed hopper 22.

Similarly, a further supply hopper 24, which may be constructed in a manner analogous to that of supply hopper 10, is adapted to convey a supply of fluff selvage or reclaimed group scrap foam material through a conductor 26, which may incorporate an air blower for the fluff, into a feeder unit 28. The feeder unit 28 incorporates a rotatable screw element 30 which will feed the scrap selvage into a conduit 32, the latter of which is also provided with a rotatable screw element 34. From the conduit 32 the reclaimed foam plastic material scrap or fluff is conveyed into the feed hopper 22 wherein it is adapted to be intermixed with the virgin polymer resin in a manner as is described in detail hereinbelow.

Within the feed hopper 22, the virgin polymer pellets and reclaimed and recycled foam plastic material selvage are intermixed through the action of a screw element 36 and, concurrently, suitable chemicals may be added to the mixture through a chemical feeder 38. The total quantity of these intermixed elements in this hopper 22 at any given time is regulated by a hopper level control (or bindicator) 40.

From the feed hopper 22, the mixed virgin polymer resin pellets and recycled selvage material is conducted into the inlet to or throat of a novel twin-screw compressor 42 wherein the material is uniformly compressed and advanced towards a first extruder 44 in which the material is brought into a molten state. If necessary, the chemical feeder may be optionally located in position 46 to add chemicals to the admixed material as it is being conveyed through the twin-screw compressor 42.

From the extruder 44 the thermoplastic foam material is conducted through a conduit 48 into a second extruder 50 which is adapted to extrude a tubular foam sheet material, as is well known in the art, and from which the tubular sheet material is conducted to a wrap station 52. From the station 52 the material is advanced to a winder 54. Thereafter, the wound plastic foam sheet, such as foamed polystyrene, is conducted into a roll aging storage 56, and when required, is conveyed to a thermoforming station 58 for producing suitably shaped plastic foam articles, such as for example, cups, plates, trays, egg cartons or the like.

From the thermoforming station 58, the finished thermoformed articles are conveyed manually or automatically to a finished product warehouse 60 for further handling, storage, packaging and subsequent shipment to a distributor or consumer.

The polystyrene scrap trim from which the finished articles have been removed in the thermforming apparatus 58 is conveyed, either manually or automatically, to a scrap grinder 62 wherein the scrap trim is comminuted or ground into either small particles or scrap fluff. The scrap fluff is then conveyed into the supply hopper 24 for recycling into the system and intermixing with the virgin polymer resin pellets supplied from the supply hopper 10 in the feed hopper 22, as described hereinabove.

Figure 2:
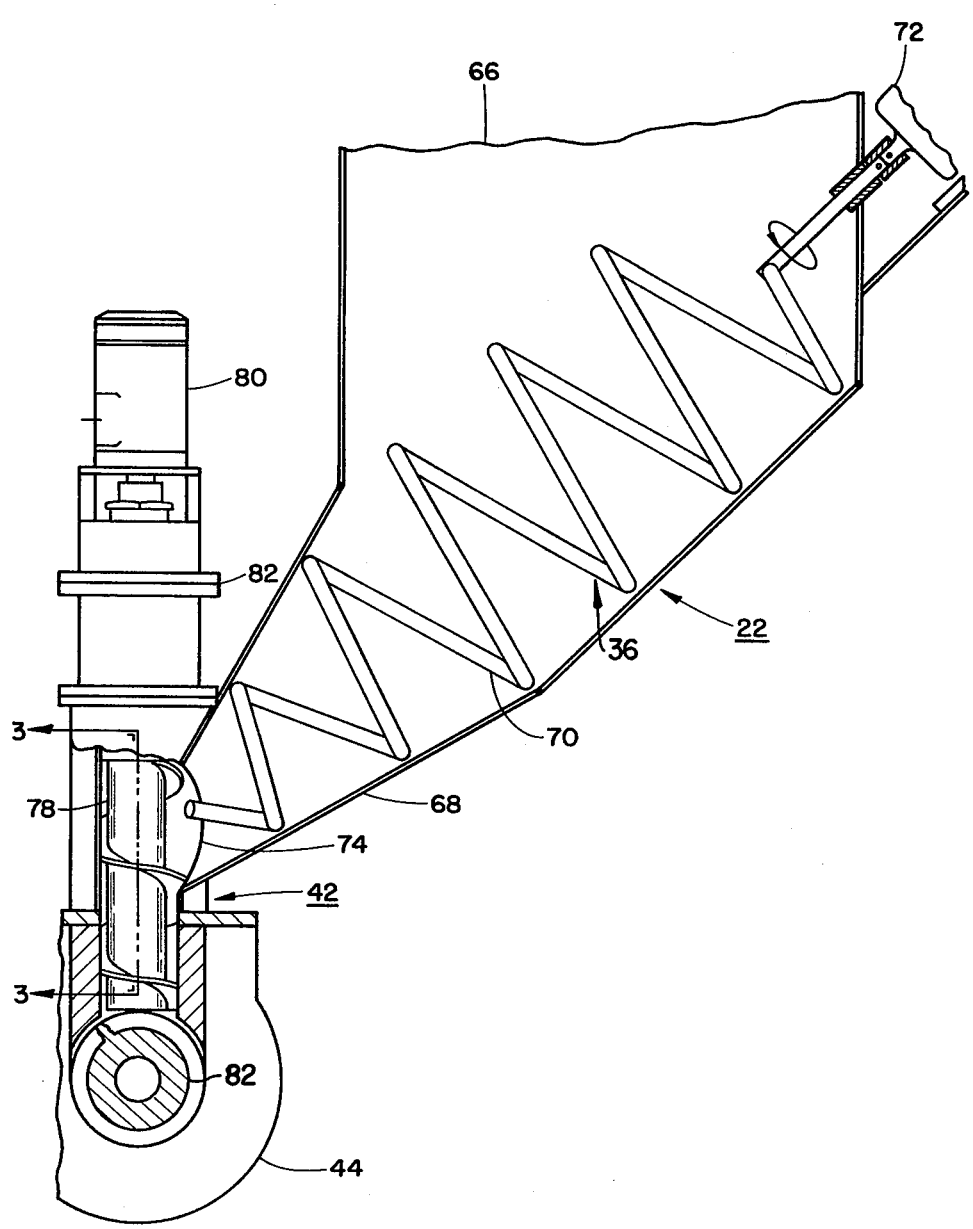
FIG. 2 illustrates a sectional view through a feed hopper with a reverse-feed screw element and a positive forward-feed twin-screw compressor pursuant to the invention.

As shown in FIG. 2 of the drawings, the feed hopper 22 includes a generally upright housing 66 having a reducing lower discharge portion 68 which is provided with an outlet communicating with the throat or inlet to the twin-screw compressor 42. The conduit 18 for the infeed of the virgin polymer resin and the conduit 32 for the infeed of the recycled selvage fluff or ground polystyrene trim which has been reclaimed from the thermoformed foam material, is conveyed through suitable inlets (not shown) into the upper end of the feed hopper 22 so as to allow for gravitational feed of the two types of plastic materials within the feed hopper.

The intermixing of these foamable plastic materials within the feed hopper 22 is effected through a rotating screw member 70, in this instance, a large extended coiled spring element which is rotated through the intermediary of a gear motor 72 mounted externally on the feed hopper 22 in a rotational direction which effect a return movement of the admixed materials in the bottom portion of the feed hopper 22 back into the hopper away from the lower hopper discharge end or the throat portion of the twin-screw compressor 42. This reverse rotation of the rotating member or spring 70 will allow material to flow through the central discharge opening formed in the bottom end of the member or spring 70 so as to stream into the throat opening of the twin-screw compressor in a unifrom free flow at a constant tumbled density and feed rate without compression and compacting of the solids at the compressor inlet throat. This will ensure that a uniformly mixed and constant density flow of intermixed polymer material is continually being conveyed into the twin-screw compressor 42 from the feed hopper 22.

Figure 3:
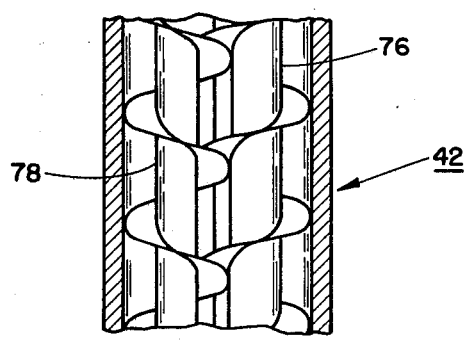
FIG. 3 illustrates a fragmentary sectional view through the twin-screw compressor taken along line 3—3 in FIG. 2.

As shown in FIGS. 2 and 3, the admixed flow of virgin polymer resin and recycled foamed selvage fluff enters the twin-screw compressor 42 at the inlet or throat 74.

Basically, the novel twin-screw compressor 42 pursuant to the invention includes a pair of elongate, interdigitating compressor screws 76 and 78 which have shafts driven from a directly-connected hydraulic motor 80 through a sealed compressor gear box 82 so as to thereby provide for a positive forward-feed of the compressed mixed polymer materials through the compressor toward a discharge end 80 communicating with a rotatable extruder screw 82 of the extruder 44. As referred to hereinabove, molten polystyrene consisting of the combined mix of selvage fluff and virgin polymer resin is conducted from the extruder 44 to the further extruder 50 for the extrusion of the foamed tubular plastic sheet.

Figure 4:
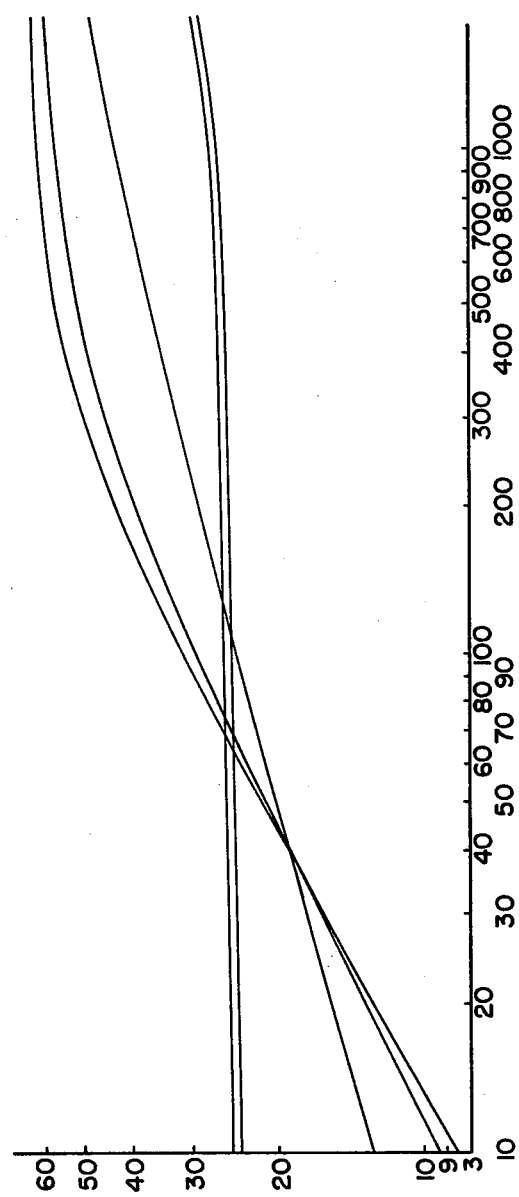
FIG. 4 illustrates the plot of a plurality of density curves for foamable plastic resins constituted of 50%-50% by weight of plastic resin and recycled selvage fluff blends.

Tabulated in FIG. 4 of the drawings, are the compressed density curves for the ground foam scrap or fluff, assuming 50% recycled selvage fluff and 50% virgin polymer pellet mix (by weight) in pounds per cubic foot, and the pressure in pounds per square inch, as the material is advanced through the twin-screw compressor 42.

Figure 5:
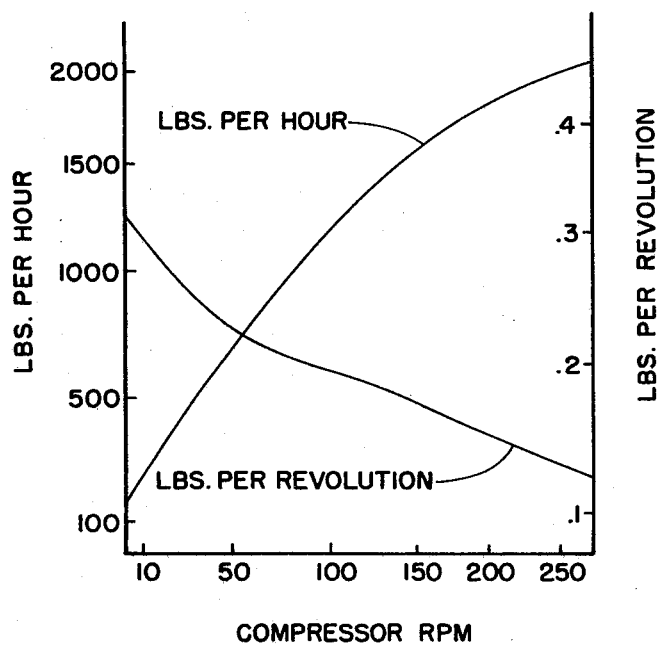
FIG. 5 illustrates a graphical representation of the feed rate for the twin-screw compressor for a 50%-50% by weight mix of foamable plastic resin and recycled selvage fluff.

Illustrated in FIG. 5 of the drawings is a tabulation of the feed rate curves for the compressor 42 with a 50%-50% mix by weight of polymer resin pellets and recycled selvage fluff.

For example, the twin screw compressor may have a low aspect ratio of 2:1 and may be designed in correlation with the feed hopper 22 so as to facilitate the supply of a 50%-50% mix of reclaimed selvage fluff and virgin polymer resin, i.e., polystyrene, at 2000 lbs. per hour feed rate. The extruder 44 which receives the compressed mix of plastic material from the twin-screw compressor 42 may be a 4½ inch extruder which, in turn, conveys the molten material formed therein to a 6-inch extruder for effecting the extrusion of the tubular foam sheet material for producing the foamed thermoformed articles.

From the foregoing there is clearly ascertainable a novel improved system and method for the reclaiming and recycling of foamed thermoformable scrap material, such as polystyrene, and for the recycling of this material to form additional thermoformed products when admixed with a foamable virgin polymer resin, thereby eliminating the requirement for the independent melt reclaim of the plastic selvage material.

While there has been shown and described what are considered to be preferred embodiments of the invention, it will of course be understood that various modifications and changes in form or detail could readily be made without departing from the spirit of the invention. It is therefore intended that the invention be not limited to the exact form and detail herein shown and described, nor to anything less than the whole of the invention herein disclosed as hereinafter claimed.

What is claimed is:

1. A method for producing a foamed thermoformable polymer material from a mixture of reclaimed polymer foam material and a foamable virgin polymer resin; comprising:
   (a) conveying a supply of reclaimed polymer foam material fluff into a feed hopper; concurrently conveying a separate supply of foamable virgin polymer resin into said feed hopper; intermixing said plastic materials in said hopper to facilitate continual and uniform free flow of the intermixed polymer materials towards a discharge in said feed hopper, said intermixing comprising imparting movement to said intermixed polymer materials in said feed hopper away from said discharge to prevent compacting of said materials at the discharge and to facilitate free flow through said discharge at a constant material density;
   (b) conveying said intermixed polymer materials into a compressor communicating with said feed hopper discharge and comprising a pair of counter-rotating interdigitating screws; compacting said materials in said compressor intermediate the pair of counter-rotating interdigitating screws to advance the admixed polymer materials through said compressor towards an extrusion arrangement for the extrusion of a thermoformable foamed polymer material product.

2. A method as claimed in claim 1, said pair of interdigitating screws in said compressor being cooperating positively-driven helical twin screws, comprising advancing and compressing said admixed polymer materials intermediate said twin screws.

3. A method as claimed in claim 1, comprising conveying said admixed polymer materials from said compressor into an extrusion arrangement consisting of a first extruder connected to the discharge of said compressor for forming a foamable melt of said combined plastic materials; and a second extruder connected to the discharge of said first extruder for receiving the foamable molten plastic material therefrom and for extruding said material into a thermoformable foam polymer sheet.

4. A method as claimed in claim 1, said reclaimed polymer foam material comprising selvage from foamed polymer material product formed during thermoforming of said material.

5. A method as claimed in claim 1, said foamable virgin polymer resin comprises foamable virgin polystyrene.

6. A method as claimed in claim 1, comprising comminuting said reclaimed polymer foam material prior to intermixing thereof with the foamable virgin polymer resin in said feed hopper.

7. A method as claimed in claim 6, wherein said reclaimed polymer foam material comprises a polystyrene foam material comminuted into fluff prior to being intermixed with said virgin polymer resin in said feed hopper.

8. A method as claimed in claim 1, said reclaimed polymer foam material comprising up to about 50% by weight of the polymer materials supplied to said feed hopper.

9. A method as claimed in claim 1, wherein said reclaimed polymer foam material comprises selvage fluff of said polymer material product from trim formed during the thermoforming of said material.

10. In apparatus for the production of a thermoformable plastic material from a mixture of reclaimed polymer material and a virgin polymer resin;
    (a) a feed hopper; means for conveying a supply of reclaimed polymer material into said feed hopper; means for concurrently conveying a separate supply of virgin polymer resin into said feed hopper; rotating means in said feed hopper for intermixing said polymer materials while facilitating free flow of the intermixed polymer materials towards a discharge in said hopper;
    (b) and a compressor having an inlet communicating with said feed hopper discharge for receiving a uniform flow of said admixed polymer materials, said compressor including a pair of counter-rotating interdigitating screws for compressing and advancing the admixed polymer materials through said compressor into an extrusion arrangement for the extrusion of a thermoformable plastic materal product, said rotating means in said feed hopper comprising a coiled spring for imparting movement to said intermixed polymer materials in said feed hopper away from the compressor inlet to prevent compression of said materials at the inlet of the compressor and to facilitate free flow of said materials through said inlet at a constant material density.

11. Apparatus as claimed in claim 10, said pair of interdigitating screws in said compressor comprising cooperating helical twin screws; and drive motor means positively driving said screws to advance and compress to some predetermined density said mixed polymer materials intermediate said twin screws.

12. Apparatus as claimed in claim 10, said extrusion arrangement comprising a first extruder connected to the discharge end of said compressor for forming a melt of said polymer materials; and a second extruder connected to the discharge of said first extruder for receiving the molten polymer material therefrom and for extruding said material into a thermoformable foam sheet.

* * * * *